United States Patent [19]

Finigan et al.

[11] 4,060,916
[45] Dec. 6, 1977

[54] SOLAR HEAT EDUCATIONAL DEVICE

[75] Inventors: George D. Finigan, Ballston Spa; Brian E. May; Henry W. Zaininger, both of Ballston Lake, all of N.Y.

[73] Assignee: Systems Using Nature Ltd., Ballston Lake, N.Y.

[21] Appl. No.: 729,111

[22] Filed: Oct. 4, 1976

[51] Int. Cl.² .......................................... G09B 25/00
[52] U.S. Cl. ...................................... 35/10; 35/49; 126/271; 237/1 A
[58] Field of Search ............... 35/10, 13, 19 R, 49, 35/51; 126/271; 60/641; 237/1 A; 165/49

[56] References Cited

U.S. PATENT DOCUMENTS

| | | | |
|---|---|---|---|
| 1,753,227 | 4/1930 | Wheeler et al. | 126/271 |
| 1,993,213 | 3/1935 | Gill | 126/271 |
| 2,122,821 | 7/1938 | Mohr | 126/271 |
| 2,655,176 | 10/1953 | Dreyfuss et al. | 35/13 UX |
| 2,933,885 | 4/1960 | Benedek et al. | 237/1 A X |
| 3,048,375 | 8/1962 | Walker | 165/49 |
| 3,061,945 | 11/1962 | Hawkins | 35/13 |
| 3,535,798 | 10/1970 | Turman | 35/51 |
| 3,673,705 | 7/1972 | Wright et al. | 35/19 R |

Primary Examiner—William H. Grieb
Attorney, Agent, or Firm—Carroll F. Palmer

[57] ABSTRACT

An educational device for use in instruction concerning solar heat utilization comprises a solar energy collector in which liquid is heated by solar energy indirectly through a heat-exchanger, a liquid storage tank, a pump and associated pipe system to circulate liquid between the collector and the storage tank, a valved by-pass line to permit recycle of liquid from and to the storage tank external of said collector and an instrument panel to display temperature of said heat exchanger, temperature of liquid contained within said collector, temperature of liquid contained in said storage tank and pressure of liquid flowing in said pipe system.

10 Claims, 2 Drawing Figures

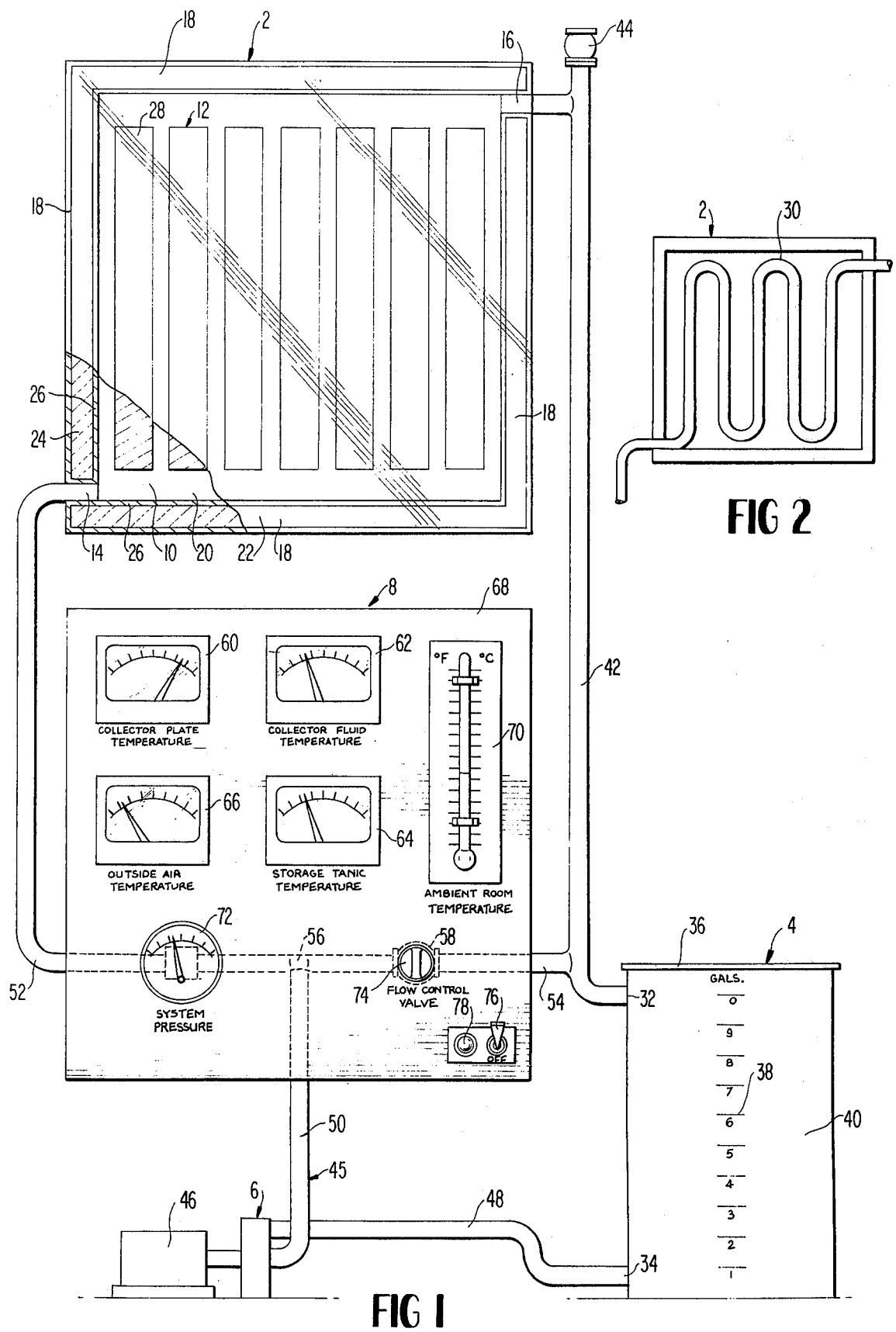

SOLAR HEAT EDUCATIONAL DEVICE

BACKGROUND OF THE INVENTION

1. Field of the Invention

This invention relates broadly to educational devices. More particularly, it concerns educational devices to be used for instruction of students about solar energy utilization and principles of solar heating.

2. Description of the Prior Art

The concept of using solar energy as a source of heat for cooking, space heating and other purposes is extremely old. Many types of devices have been employed to accumulate, transfer and utilize the solar heat, e.g., lenses, reflectors, air heaters, water heaters and the like. Many of the schemes and developments relating to solar energy use are impractical because of cost factors, inefficiency and other reasons.

The present invention relates to that segment of solar energy utilization wherein a mass of circulating liquid is used as a means of utilizing solar heat by heat exchange in a collector device which absorbs solar energy at a place remote from the point of utilization of the absorbed solar heat. This basic type of device is old as shown by U.S. Pat. Nos. 1,753,227; 1,993,212; 2,933,885 and 3,048,375.

The cost of all forms of energy are continually increasing and, in fact, is on a rpid increase. While solar energy use, as pointed out above, has not been a sizeable factor in total energy use, the fact that the costs of other energy forms is on such a rapid increase has generated much greater interest in solar energy use systems. Invention and development of efficient systems for solar energy utilization will, in large measure, depend upon the education of students and others concerning solar energy principals and practice. There is a need for instructional aids for the study of the benefit and availabiliy of solar energy by students.

OBJECTS

A principal object of the present invention is the provision of a simple, reliable, efficient solar energy collection system to be used for instruction of students about solar energy utilization.

A further object is the provision of educational devices adapted to classroom instruction of students about the benefits and availability of solar energy and its relationship to the energy supply problems of the world, determining energy available from the sun and develop student interest in solar energy.

Other objects and further scope of applicability of the present invention will become apparent from the detailed description given hereinafter; it should be understood, however, that the detailed description, while indicating preferred embodiments of the invention, is given by way of illustration only, since various changes and modifications whihin the spirit and scope of the invention will become apparent to those skilled in the art from this detailed description.

SUMMARY OF THE INVENTION

These objects are accomplished according to the present invention by constructing an education device for use in instruction concerning solar heat utilization which comprises:

A. A solar energy collector in which liquid is heated by solar energy indirectly through a heat-exchanger, B. A liquid storage tank remote from the solar energy collector, C. A pump and associated pipe system to circulate liquid between the collector and the storage tank, D. A valved by-pass line to permit recycle of liquid from and to the storage tank external of the collector and, E. An instrument panel to display:
  a. temperature of the heat-exchanger within the heat collector,
  b. temperature of liquid contained within the heat collector,
  c. temperature of liquid contained in the storage tank and
  d. pressure of liquid flowing in the pipe system.

The operation of the educational device can be described as follows:

1. The solar energy collector converts solar radiation to heat energy,
2. Water or water plus anti-freeze and/or corrosion inhibitors or other additives is pumped from the storage tank through the solar energy collector and back to the storage tank to collect the absorbed heat,
3. Operation of the system is monitored at the instrument panel by the student, and
4. Control of the system is effected by student manipulation of the by-pass control valve which protects the pump from over-pressure and adjusts the quantity of liquid passing per unit time through the energy collector.

The storage tank is at a level below the instrument panel and the energy collector so that liquid in the device may drain by gravity into the storage tank. A check valve is provided in the pipe system which automatically opens to place the system at ambient pressure when the circulation pump is stopped.

BRIEF DESCRIPTION OF THE DRAWINGS

A more complete understanding of the invention may be obtained by reference to the accompanying drawing in which:

FIG. 1 is a diagrammatic elevational view of an educational device constructed in accordance with the invention.

FIG. 2 is a reduced-scale fragmentary, diagrammatic elevational view of an alternate form of collector means for the new educational devices.

DESCRIPTION OF THE PREFERRED EMBODIMENTS

Referring in detail to the drawings, the new educational device as shown comprises solar energy collector means 2, storage tank 4, pump and pipe system 6 and instrument panel 8.

The collector means 2 has a chamber portion 10 to contain liquid which is to be heated by heat-exchanger 12, a liquid flow inlet 14 and a liquid flow outlet 16. The chamber portion 10 is defined by the sides 18, bottom 20 and top 22. Advantageously, the sides and top are formed of structural framework and insulation 24 and metallic reflector surface 26. The top 22 is formed of an infrared ray transparent panel of plastic, e.g., "Tedlar".

The heat exchanger 12 consists of a series of bars or narrow plates 28 having at least the surface facing the top 22 with a black finish. In a preferred form, the bars 28 are formed of copper metal which is coated with flat black copper oxide. Alternatively, the bars 28 may be electroplated with flat black chrome, with flat black paint or other heat-conductive coating. In addition, aluminum metal, Al alloys, steel or the like may be used instead of copper. Also, anodized coatings, sputtered coatings or the like may be used to provide the black outer-surface for the bars 28.

In the modification shown in FIG. 2, the heat exchanger comprises the zig-zag section of metal pipe 30 within the chamber 10. The pipe 30 may be made of metal and coated as described above for the bars 28.

In the construction of the collector 2, various thickness of insulation and various types thereof may be used in forming the walls 18 and bottom 20. Also the reflective layer 26 may be omitted. The top or cover 22 may be formed of any suitable transparent material including glass and fiber-reinforced resin. The new instructional device may comprise a single collector means 2 or a plurality of them in conjunction with the other components 4, 6 and 8.

The storage tank 4 is provided with fluid flow inlet 32 and outlet 34. Advantageously, it has a removable closure 36 and content makings 38. It may be formed of any suitable material, e.g., metal, plastic, ceramic, glass, etc. Preferably it is made of shock resistance plastic, capable of withstanding temperatures up to about at least 110° C, that is at least translucent so that the contents may be viewed through the vertical walls 40, e.g., high-impact polypropylene. The storage tank 4 can be varied in size to accomodate one or more collector units. In single collector devices a storage tank capacity of about 40-50 liters is preferred.

The outlet 16 is connected to the storage tank inlet 32 by first conduit means 42 which includes a one-way check valve 44 that operates upon cessation of flow through conduit means 42 to open the system to ambient pressure which will allow liquid in the system to drain from collector 2 and conduit means 42 into storage tank 4. The new instruction device has been designed to be drained of all fluid several times daily between typical instructional periods so that several different groups of students may perform the same or varied experiments beginning with any desired fluid temperature rather than the carry over temperature from the preceeding user. Due to the fact that this necessitates several system fluid changes daily, it is expected that most users will use tap water as the primary system fluid due to its availability and minimal cost. Additives that will prevent the system from freezing would increase the cost of system operation as well as allow a large margin for error in the proper chemical balance which could result in severe system damage. Hence, it is preferred that the system be drained when it is not in operation. The air check valve 44 on the collector insures that the system will easily and automatically drain when it is not in operation. When the system pump is not operational, atmospheric pressure will force the check valve open insuring that both the collector and system piping will drain back into the storage tank. The collector coil manifolds are sloped approximately 5° to further insure that all fluid will drain from the collector 2. When fluid is being pumped through the system, the fluid pressure will force the check valve 44 to the closed position insuring proper system operation.

The pump and pipe system 6, in addition to the first conduit means 42, includes second conduit means 45 and pump means 46. The conduit means 45 comprises pipe or tube section 48, riser 50, a collector inlet line 52 and a by-pass line 54 joined at the tee 56. The line 54 includes a valve 58 between the tee 56 and storage tank inlet 32. Regulation of the valve 58 controls the amount of liquid exiting from pump 46 that passes in line 54 relative to that which passes in line 52. Hence, parameters of operation of the device may be controlled by manipulation of valve 58.

The pump 46 may be of any basic type, e.g., piston, bellows, etc., but advantageously, is a rotary gear type capable of variable delivery volume and pressure. Preferably, the pump 46 is capable of continuous duty at a fluid temperature of up to about 95° C, a pressure of up to about 500 gms./ sq. cm. and a delivery volume of at least 4 liters/minute.

The instrument panel 8 comprises four temperature gauges 60, 62, 64 and 66 mounted on panel board 68. Also mounted thereon are a fluid-expansion thermometer 70 and a pressure gauge 72. The valve 58 is supported upon the back of the board 68 and the control handle 74 extends though the board 68 so that the valve may be controlled by a student monitoring the operation of the equipment by the instrument panel 8.

The gauge 60 visually indicates the temperature of the heat exchanger means 12. The gauge 62 indicates the temperature of liquid present in the collector 2. The gauge 64 indicates the temperature of liquid in the storage tank 4. The gauge 66 indicates the temperature ambient to the collector 2, e.g., the temperature of the air on the roof of a building on which collector 2 is mounted. Thermometer 70 indicates the temperature of the air ambient to the storge tank 4. Preferably the storage tank 4 is in the same room or space with the instrument panel so thermometer shows the temperature ambient to both the tank 4 and the panel 8.

An on-off switch 76 and a pilot light 78 to indicate on-condition of the unit are also preferably mounted on the panel board 68.

The panel board 68 can be made of any suitable material, e.g., the plastic Kydex and will be supported by suitable braces (not shown) or the like.

The gauges 60–66 can be of any commercially available type suitable to function with pyrometers (not shown) located at the equipment section for which the gauge indicates the temperature. The gauges and associated pyrometers are selected to provide the following temperature ranges:

gauge 60 : −25° to 320° C
gauge 62 : −10° to 110° C
gauge 64 : −25° to 50° C
gauge 66 : −10° to 110° C.

In addition to the basic data indicators discussed above, the instrument panel 8 may be equipped with one or more of the following additional units:
1. An instrument for the measurement of solar radiation in "langleys".
2. A photo cell or mechanical timer system for automatic on-off control of the device.
3. Multiple collector plate temperature gauges.
4. Storage tank level and/or quantity indicators.
5. Storage tank fluid temperature regulation controls.
6. Collector outlet pressure indication.
7. Collector stress-strain instrumentation.
8. Chart recorders for all above standard and optional instrumentation.

The use of the educational devices of the invention is not complicated. With switch 76 in the off-position, a student records the volume of liquid in storage tank 4. Valve 58 is closed to cause all liquid leaving the tank 4 via pump 46 to flow to collector 2. Readings from all the instruments 60–72 are recorded and then switch 76 is turned on. When operation of the pump 46 has brought liquid flow in the system to a steady-state, the student records the volume of liquid in the storage tank 4 to give a reading on volume of liquid in the collector 2 and conduits 42 and 45. The student may then regulate valve 58 to allow various amount of liquid to flow in the by-pass line 54 thereby reducing the volume of liquid passing per unit time through the collector. Readings of the instruments 60–72 will be taken with each change in the setting of valve 58 so that the student may evaluate the interrelationship of collector heat, storage tank temperature, etc., in operation of the device. Under the direction of an instructor, the student can make numerous calculations and come to understand a variety of factors involved in utilization of solar energy for space heating, process heating or other heat applications.

What we claim as our invention is:

1. An educational device for use in instruction concerning solar heat utilization which comprises:
   A. solar energy collector means comprising a chamber portion to contain liquid to be heated by solar energy absorbed by said collector means, a liquid flow inlet to said chamber portion, a liquid flow outlet from said chamber portion, and heat-exchanger means to assist in transfer of heat absorbed by said collector means to said liquid,
   B. a liquid storage tank separate from said collector means having a fluid flow inlet and a fluid flow outlet,
   C. first conduit means connecting said collector means outlet to said storage tank inlet for circulating liquid from the collector means to the storage tank,
   D. second conduit means connecting said storage tank outlet to said collector means inlet for recycling liquid from the storage tank to the collector means,
   E. pump means to produce liquid flow through said first and second conduit means,
   F. a by-pass line connecting said first conduit means to said second conduit means of liquid flow therethrough external of said collector means,
   G. a control valve in said by-pass line to regulate the quantity of liquid that flows therethrough, and
   H. an instrument panel comprising measurement display means to indicate:
      a. temperature of said heat-exchanger means, temperature of liquid contained within said collector means,
      c. temperature of liquid contained in said storage tank, and
      d. pressure of liquid flowing in said second conduit means.

2. The educational device of claim 1 wherein there is a check valve in said first conduit means to vent said first conduit means to ambient pressure when said pump means ceases to produce said liquid flow.

3. The educational device of claim 1 wherein said instrument panel includes measurement display means to visually indicate room temperature ambient to said panel and air temperature ambient to said collector means.

4. The educational device of claim 1 wherein said storage tank is positioned relative to the remaining components of the device that liquid may flow by gravity from said collector means to said storage tank.

5. The educational device of claim 1 wherein said collector means comprises a flat, rectangular chamber having a bottom, four sides and a top, said top being transparent to infra-red rays and said heat-exchanger means comprises a metal tube through which flows said liquid to be heated.

6. The educational device of claim 5 wherein the outside surface of said metal tubes is black.

7. The educational device of claim 6 wherein said metal tube is made of copper and said black surface is formed of black copper oxide.

8. The educational device of claim 7 wherein the bottom of said chamber is a relector for infra-red rays.

9. The educational device of claim 1 wherein said liquid is water.

10. The educational device of claim 9, wherein said water contains anti-freeze additive.

* * * * *